United States Patent [19]
Shields

[11] 3,930,084
[45] Dec. 30, 1975

[54] PLASTIC DECORATIVE INLAY IN A FLOOR MAT

[75] Inventor: Ronald F. Shields, Palos Verdes Estates, Calif.

[73] Assignee: Royal Industries, Inc., Pasadena, Calif.

[22] Filed: Oct. 21, 1974

[21] Appl. No.: 516,387

[52] U.S. Cl. ............... 428/67; 428/138; 156/298; 156/303.1; 296/1; 52/660
[51] Int. Cl.².... B32B 1/04; B32B 3/10; B29D 3/00; E04C 5/04
[58] Field of Search ......... 161/5, 39, 109, 111, 112; 156/293, 298, 303.1; 296/1 F; 428/67, 138; 52/660

[56] References Cited
UNITED STATES PATENTS

| | | | |
|---|---|---|---|
| 170,941 | 12/1875 | Dunbar et al. | 156/298 X |
| 2,810,672 | 10/1957 | Taylor | 296/1 F X |
| 3,129,972 | 4/1964 | Vodra | 296/1 F |
| 3,337,258 | 8/1967 | Steinberg | 296/1 F |
| 3,530,022 | 9/1970 | Mallory | 156/303.1 X |
| 3,605,166 | 9/1971 | Chen | 296/1 F X |

Primary Examiner—Philip Dier
Attorney, Agent, or Firm—Christie, Parker & Hale

[57] ABSTRACT

A generally flat rubber base, such as a floor mat, includes a plastic decorative inlay releasably interlocked in the top of the rubber mat without the need for adhesives, bonding materials, or the like.

16 Claims, 3 Drawing Figures

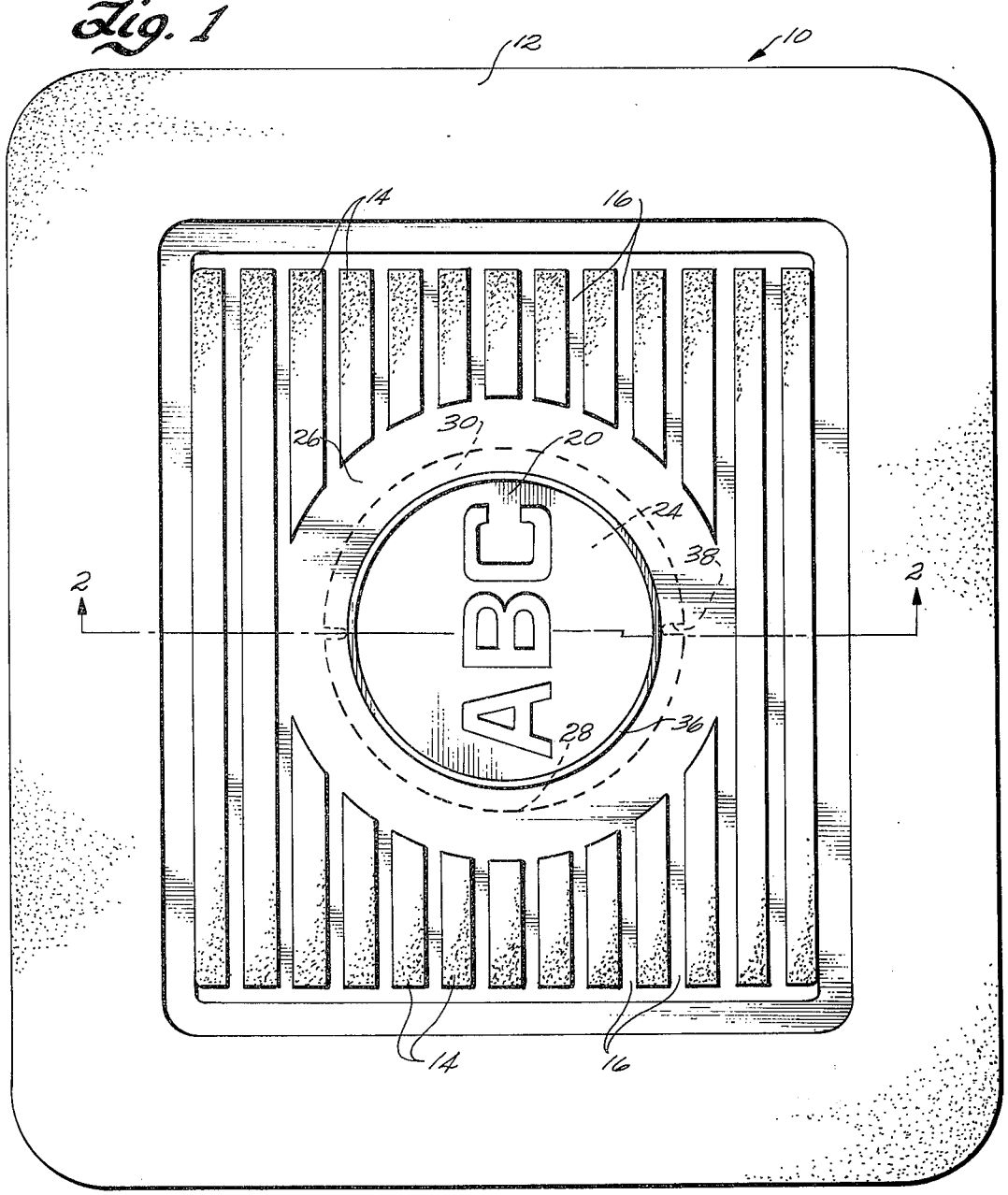
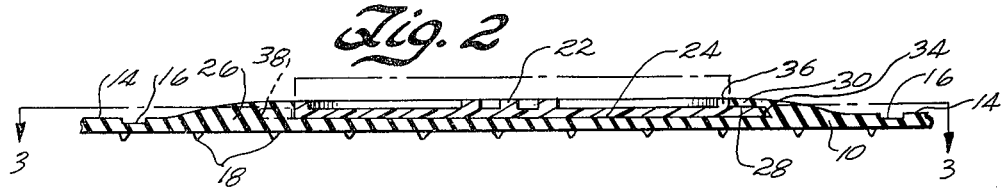

PLASTIC DECORATIVE INLAY IN A FLOOR MAT

BACKGROUND

This invention relates to decorative articles of manufacture made of rubber, such as floor mats.

Rubber floor mats are commonly used on the floors of automobiles to keep them clean and reduce wear on the floor carpets of the automobile. Plain floor mats are common and are relatively inexpensive. More colorful and decorative floor mats, such as "coco mats", are more expensive. Decorative rubber floor mats, such as mats displaying colorful insignias of the automobile manufacturer, also are expensive. The problem of producing a colorful, decorative rubber floor mat is that a given rubber mat cannot be made in a variety of colors. Plastic can be used to obtain a large number of colors, but plastic is expensive compared to rubber. Rubber is a good material for use in floor mats because it is relatively inexpensive, and also because it is economically feasible to provide rubber mats with textured bottom surfaces for preventing slippage on the automobile floor. Such traction surfaces are difficult and costly to mold in plastic by the most convenient process known at the present time.

The decorative portion of a rubber floor mat can be provided by a colorful plastic insert attached to the rubber mat. However, adhesives which are so inexpensive as to make such a floor mat attractive economically have difficulty in producing a good bond between the rubber and the plastic insert. More expensive adhesives render the end-product economically undesirable to manufacture. A further objection is that processes involving applying adhesives to a rubber insert are cumbersome and time consuming.

SUMMARY

This invention provides a decorative rubber article, such as a floor mat, which is relatively inexpensive to manufacture.

Briefly, the invention includes a rubber base having a recess in its top surface, and a plastic decorative inlay releasably interlocked with the recess. The interlocking fit holds the inlay in a fixed position relative to the base, with the decorative surface of the inlay being displayed in the top surface of the rubber base. The releasable interlock avoids the need for adhesives, bonding materials, or the like.

In a preferred form of the invention, the recess has a peripheral undercut below the surface of the base, and an outer edge portion of the plastic inlay is releasably held in the undercut by a projecting portion of the rubber base which overlaps a top portion of the inlay to hold the inlay in place.

Thus, a floor mat according to this invention has the advantages characteristic of mats made of rubber, while providing a decorative plastic inlay which can be obtained providing a decorative plastic inlay which can be obtained in a large number of colors and molded configurations. Moreover, the releasable attachment between the rubber mat and the plastic inlay avoids the need for expensive adhesives which otherwise makes such a mat economically unfeasible.

These and other aspects of the invention will be more fully understood by referring to the following detailed description and the accompanying drawings.

DRAWINGS

FIG. 1 is a plan view showing a rubber floor mat and decorative plastic inlay according to this invention;

FIG. 2 is a fragmentary cross-sectional elevation view taken on line 2—2 of FIG. 1.

DESCRIPTION

Figure 3:
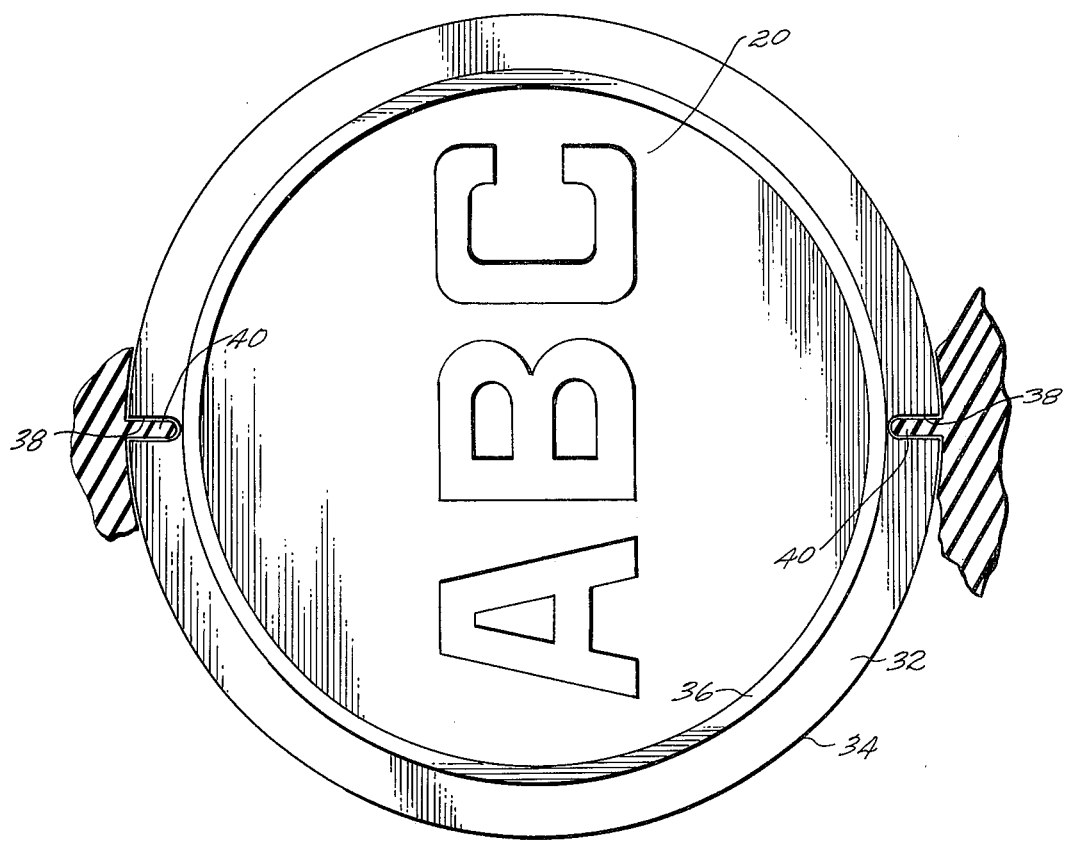
FIG. 3 is a plan view taken on line 3—3 of FIG. 2.

Referring to FIGS. 1 and 2, a generally flat, rectangular rubber floor mat 10 has a border 12 extending around the periphery of the floor mat. A series of generally parallel, elongated ribs 14 are located in the central region of the floor mat inside the border 12. The ribs 14 are separated by generally parallel, elongated indentations 16. The ribs 14 are raised above the indentations to provide a suitable textured top surface for the floor mat. Preferably, the surfaces of the border 12 and the ribs 14 are roughened, and the indentations 16 have smooth, high-polish surfaces, although other forms of textured surfaces for the floor mat can be provided without departing from the scope of the invention.

The bottom surface of the floor mat has a pattern of spaced apart rubber projections 18 for providing a textured traction undersurface to prevent slippage between the mat and the floor.

A decorative inlay 20 is releasably attached to the central region of the floor mat. The inlay 20 includes a decorative top surface with a suitable design, such as letters 22 forming a company insignia, or the like. It is desirable that the decorative inlay be in a large number of colors, and be molded to provide a large number of designs. Therefore, the inlay is preferably made from a plastic material, such as polyvinyl chloride, which can be molded into appropriate shapes and filled with a large number of different pigments.

The plastic inlay 20 is flexible and foldable so it can be easily inserted manually into a recess 24 formed in the top surface of the floor mat. The recess 24 is located centrally in a raised section 26 formed in the central region of the rubber floor mat. The recess 24 includes a peripheral undercut 28 below the raised section of the floor mat. The undercut 28 provides a flexible protruding lip 30 which encircles the outer periphery of the recess 24. The undercut 28 matches the shape of an outer peripheral rim 32 of the decorative inlay 20. In use, the decorative inlay is releasably inserted into the recess 24 so the rim 32 of the inlay is seated snugly in the undercut 28, with the design on the inlay being displayed in the top surface of the mat. The flexible peripheral lip 30 of the recess can be folded back so the rim 32 of the inlay can be easily inserted into the undercut 28. When the inlay 20 is in place, the peripheral lip 30 overlaps the top surface of the rim 32, which provides means for keeping the inlay in place in the mat. A peripheral edge 34 of the inlay is tapered so it will be flush with the correspondingly shaped edge of the rubber undercut. A continuous ridge 36 extends around the top surface of the inlay 20. The ridge 36 is a molded part of the plastic inlay, and in the embodiment shown in the drawings, the ridge is circular and concentric with the circular outer edge 34 of the inlay. The ridge is spaced inwardly from the edge 34 by a distance equal to the overlap of the lip 30. Thus, the inner edge of the lip 30 abuts against the outer edge of the ridge 36 continuously around the ridge to provide additional means for holding the inlay in place. The top surface of the ridge 36 also is flush with the top surface of the lip 30.

The circular inlay 20 has a pair of opposed slots 38 formed in its rim 32. In use, when the inlay 20 is placed in the recess 22, the slots 38 are interlocked with corresponding rubber detents 40 formed in the opposite sides of the undercut portion of the rubber mat. The interlocking detents 40 prevent rotation of the inlay relative to the mat. In an alternate form of the invention, the inlay can be shaped as a square, rectangle, or other geometrical configurations having corners, and the undercut portion of the mat can be provided with a matching geometrical shape. In this case, relative rotation between the inlay and the floor mat is prevented, without the need for detents, when the corners of the inlay are interlocked with their correspondingly shaped corners of the undercut.

Thus, the invention provides a rubber floor mat with a decorative portion which can be provided in a large number of colors by virtue of the plastic inlay. The need for expensive adhesives for holding such an inlay in place is eliminated, which reduces the cost of the floor mat. Moreover, the releasable fit allows the owner to remove one decorative inlay and replace it with another.

I claim:

1. An article of manufacture comprising a rubber base having a top surface, a flexible and foldable plastic inlay having a decorative surface, and means for securing the inlay to the rubber base in a releasable, interlocking fit in a fixed position relative to the base with the decorative surface of the inlay being displayed in the top surface of the base, the securing means including a raised section formed in the top surface of the rubber base, a recess formed in the raised section of the base, and a peripheral undercut below the top surface of the base for releasably holding an outer edge portion of the plastic inlay under a projecting portion of the base which overlaps the undercut.

2. An article of manufacture according to claim 1 including detent means formed in the undercut for interlocking with the plastic inlay to prevent the inlay from rotating relative to the base.

3. An article of manufacture according to claim 2 including one or more notches formed in the outer edge portion of the inlay for interlocking with the detent means.

4. An article of manufacture according to claim 1 in which the projecting portion of the base is a flexible lip extending around the recess.

5. An article of manufacture according to claim 1 including a ridge extending above the decorative surface of the plastic inlay, the ridge being shaped to abut against the edge of the projecting portion of the base when the inlay is held in the recess.

6. An article of manufacture according to claim 1 in which the base comprises a generally flat rubber floor mat having a top traction surface, and in which the decorative plastic inlay occupies a minor portion of the floor mat traction surface.

7. An article of manufacture according to claim 5 in which the projecting portion of the base is a flexible lip extending around the recess, the decorative inlay having a peripheral outer portion spanning the ridge on the inlay, the portion of the inlay overlapping the peripheral outer edge portion of the flexible inlay.

8. An article of manufacture comprising:
a rubber base having a top surface;
a flexible and foldable plastic inlay having a decorative surface, and a ridge extending above the decorative surface, and a peripheral portion spanning the outside of the ridge; and
means securing the inlay to the rubber base in a releasable, interlocking fit so the inlay is held in a fixed position relative to the base with the decorative surface of the inlay being displayed in the top surface of the base;
the securing means including a recess formed in the top surface of the rubber base, the recess having a peripheral undercut below the top surface of the base for releasably holding the peripheral edge portion of the plastic inlay under a projecting portion of the base which overlaps the undercut, the projecting portion of the base being a flexible lip extending around the recess and overlapping the peripheral edge portion of the flexible inlay so the ridge abuts against the edge of the projecting portion of the base when the inlay is held in the recess.

9. An article of manufacture according to claim 8 including detent means in the undercut for interlocking with the plastic inlay, and one or more notches formed in the outer peripheral portion of the inlay for interlocking with the detent means to prevent the inlay from rotating relative to the base.

10. An article of manufacture according to claim 9 in which the base comprises a generally flat rubber floor mat having a top traction surface, and in which the decorative inlay occupies a minor portion of the area of the traction surface of the mat.

11. A floor mat comprising:
a rubber base having a top surface constructed and defined with a traction surface area covering a major portion thereof;
a plastic inlay constructed and defined with a decorative surface over an area occupying a minor portion of the area of the traction surface; and
means constructed integrally with the rubber base for releasably securing the plastic inlay to the rubber base so the decorative surface of the inlay is displayed in the traction surface of the base;
the securing means including a recess formed in the traction surface to receive the inlay, a peripheral undercut extending around the recess below the top surface of the base for receiving an outer edge portion of the inlay under a projecting portion of the base which overlaps the undercut, and means in the undercut portion of the recess for releasably interlocking with the outer edge portion of the inlay to releasably hold the inlay in a fixed position relative to the base.

12. A floor mat according to claim 11 including detent means formed in the undercut portion of the recess, and one or more notches formed in the outer edge portion of the inlay for interlocking with the detent means to prevent the inlay from rotating relative to the base.

13. A floor mat according to claim 12 in which the projecting portion of the base is a flexible lip extending around the recess.

14. A floor mat according to claim 13 in which the inlay is a flexible and foldable plastic piece.

15. A floor mat according to claim 11 including means constructed integrally with the bottom surface of the rubber base to prevent slippage between the floor mat and its mounting surface.

16. A floor mat according to claim 11 wherein the plastic inlay is constructed of polyvinyl chloride.

* * * * *

UNITED STATES PATENT OFFICE
CERTIFICATE OF CORRECTION

Patent No. 3,930,084          Dated December 30, 1975

Inventor(s) Ronald F. Shields

It is certified that error appears in the above-identified patent and that said Letters Patent are hereby corrected as shown below:

Column 1, line 59, after "plastic inlay"
           line 60 delete "which can be obtained providing a decorative plastic inlay".

Signed and Sealed this

Twentieth Day of July 1976

[SEAL]

Attest:

RUTH C. MASON
*Attesting Officer*

C. MARSHALL DANN
*Commissioner of Patents and Trademarks*